United States Patent [19]

Augusztin

[11] 4,110,936
[45] Sep. 5, 1978

[54] GRINDING ARBOR

[76] Inventor: Bela Augusztin, 261 Fourth Ave., Stratford, Conn. 06497

[21] Appl. No.: 785,325

[22] Filed: Apr. 7, 1977

[51] Int. Cl.² .................................................. B23G 3/04
[52] U.S. Cl. ....................................... 51/218 R; 51/225
[58] Field of Search ................... 51/225, 218 R, 218 A, 51/220

[56] References Cited

U.S. PATENT DOCUMENTS

| | | | |
|---|---|---|---|
| 1,321,970 | 11/1919 | Beach | 51/218 R |
| 1,904,304 | 4/1933 | Flanders | 51/218 R |
| 3,395,496 | 8/1968 | Sweeny | 51/220 |
| 3,626,643 | 12/1971 | Kirchgessner | 51/218 A |

*Primary Examiner*—Harold D. Whitehead

[57] ABSTRACT

A grinding arbor for holding one or more cutting tools such as a chaser is desirably provided with two or more stations so that all members of the set may be ground uniformly. The body of the arbor is sectioned preferably in a generally L-shaped cross-section terminating at the butt end so as to define a planar seat and a laterally stepped wall. Removable or adjustable stop means project from the stepped wall whereby the cutting tool or chaser, when seated, is engaged by the stop means. Clamping means releasably secures the cutting tool or chaser in the station.

6 Claims, 5 Drawing Figures

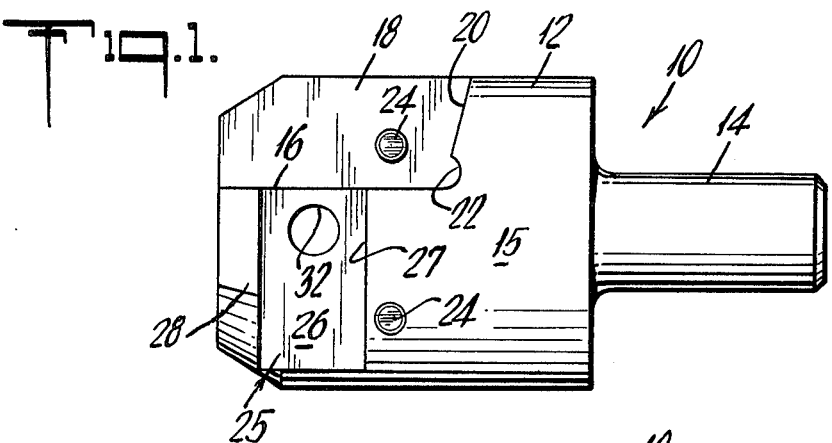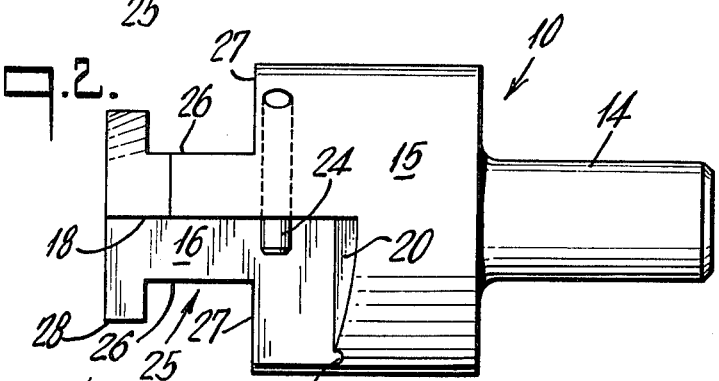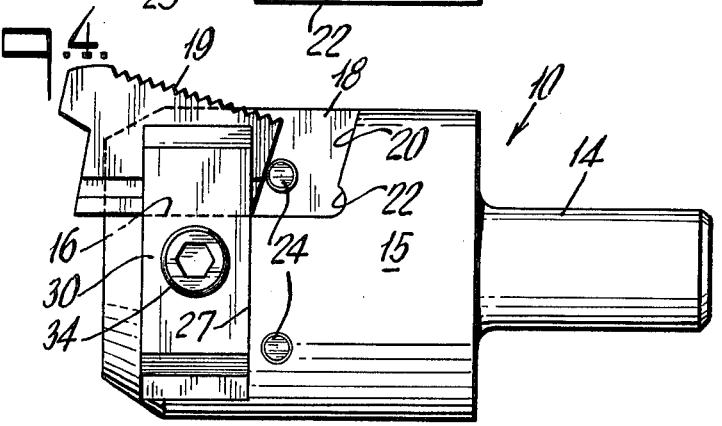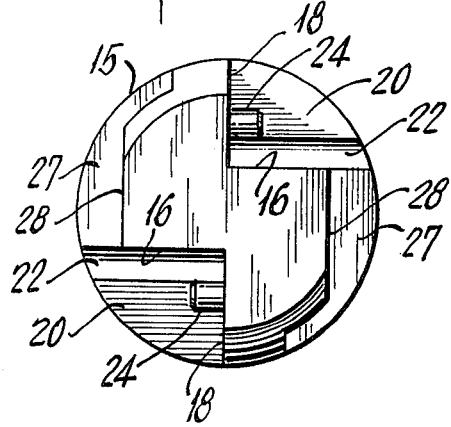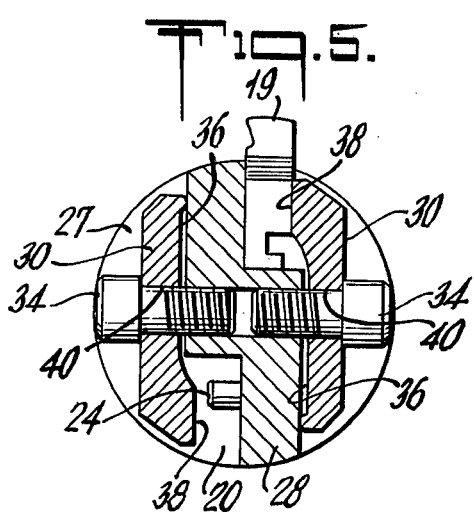

GRINDING ARBOR

BACKGROUND OF THE INVENTION

This invention relates to a grinding arbor. In its more specific aspect, this invention relates to a grinding arbor for thread cutting tools such as chasers and the like, and especially an arbor for holding a chaser when grinding the chamfer.

Threading tools such as cutters or chasers and the like for cutting and finishing screw threads typically have a cutting face comprising a plurality of teeth and a beveled portion known as the chamfer which leads the tool onto the work. A precision ground chamfer is essential for cutting accurate threads. Because of wear, chasers must be resharpened frequently at the chamfer, usually a few thousands of an inch at any one resharpening. Further, chasers are employed in a set, e.g., four chasers to a set, and unequal grinding of the chasers in a set will cause the chasers to cut unevenly.

Chasers therefore cannot be ground by hand. It is conventional for this purpose to use a grinding fixture designed and operated so that all chasers of a set can be resharpened at one set-up. In this manner, the chasers are uniformly ground. However, these fixtures require numerous settings and exceedingly fine adjustments by a skillful mechanic. The chaser is inserted into a holder which is then clamped to the fixture and set to the proper chamfer clearance angle. The fixture is fed forward by hand to bring the chaser in contact with the grinding wheel wheel until it contacts a stop. The procedure is repeated for each chaser of a set at the same setting to insure uniformity of chamfer.

Chaser grinding fixtures have numerous disadvantages. The fixture is relatively expensive. More importantly, extreme precision in setting-up the operation is essential, which inherently takes considerable time, and only one chaser at a time can be ground. Notwithstanding the extreme care given, it is still difficult to achieve uniformity of chamfer among the members of a set.

It is the purpose of this invention to provide a grinding arbor which overcomes the disadvantages of the prior art grinding fixtures, and particularly to provide an arbor whereby all members of a set may be ground uniformly.

DESCRIPTION OF THE INVENTION

Broadly the grinding arbor of my invention comprises a body of substantially cylindrical shape, and although a cylindrical body of substantially circular cross-section is preferred, it should be understood that other cross-sectional shapes may be employed. A portion of the body is sectioned, preferably in a generally "L" shaped cross-section, terminating at the butt end of the body so as to define a planar seat and a laterally disposed side wall or shoulder. More preferably, the planar seat is substantially parallel with the longitudinal axis of the body, and the laterally stepped wall extends from the inner marginal edge of the seat which provides a shoulder substantially normal to the seat. The seat and laterally stepped shoulder in conjunction with the butt end of the body define a mount or station for the chaser. Removable or adjustable stop means project from the stepped shoulder whereby the chaser, when seated, is engaged at one edge by or abuts with the stop means or, if removed, the butt end of the body. In this manner, the grinding arbor can accomodate different size chasers. The arbor further includes means for releasably clamping the chaser in the mount or station.

In the preferred embodiment, the grinding arbor is provided with a plurality of stations so as to accomodate a set of chasers. The body is identically sectioned in symetrically opposite "L" shaped cross-sections about the horizontal axis of the body. An arbor with six stations, for example, can accomodate six chasers for resharpening with a single set-up, but it should be understood that the arbor may include any number of stations typically ranging from two to 12.

BRIEF DESCRIPTION OF THE DRAWINGS

FIG. 1 is a side elevational view of the grinding arbor embodying my invention.

FIG. 2 is a side elevation of the arbor FIG. 1 rotated 90°.

FIG. 3 is an end view of the arbor FIGS. 1 and 2.

FIG. 4 is a view of FIG. 1 showing a chaser clamped in a station.

FIG. 5 is an end view of FIG. 4.

DESCRIPTION OF THE PREFERRED EMBODIMENTS

Referring to the drawings, where like reference numerals designate similar parts throughout the various views, there is shown an embodiment of my invention a grinding arbor designated generally by the numeral 10 particularly suitable for grinding a set of two chasers. The arbor comprises a substantially cylindrical body 12 having a longitudinally extending shank 14 extending from one end and concentrically disposed therewith. The shank is inserted into a collet (not shown) for holding the arbor when the chasers are ground or sharpened.

As shown in FIGS. 1 - 3 in particular, the arbor is provided with two longitudinally extending sections of generally "L" shaped cross-section providing for a reduced portion at the butt end 15. The sections are symetrically opposite about the horizontal axis of the body. Each section has a planar seat 16 extending from the butt end of the body and running substantially parallel with the longitudinal axis of the body for effecting seating contact with the chaser, as explained hereinbelow in greater detail. Laterally disposed wall or shoulder 18 substantially normal to the seat extends upwardly from the inner marginal edge of the seat. The seat and side wall define a mount or station for receiving a chaser 19, which, when inserted, is engaged along one edge (e.g., bottom surface opposite the cutting face) by the planar seat 16 and at its side by the side wall 18 (See FIG. 4).

Rear wall 20 at the butt end of the body extends upwardly from planar seat 16 and is substantially normal to the side wall 18. Wall 20 typically is disposed at an angle to the planar seat and terminates along its bottom edge at the junction with planar seat 16 with a transversely extending recess or undercut for reasons more fully explained below.

Side wall 18 is provided with one or more holes for accommodating dowel pin 24 which fits snugly in the hole and projects laterally from the side wall. The chaser 19 is mounted on a planar seat 16 and against side wall 18 in such a manner that a marginal edge of the chaser engages dowel pin 24. Chasers however vary in size, and by providing more than one hole in the side wall, the position of the dowel pin may be varied to fit the side of the chaser; or if the chaser is particularly large, the dowell pin may be removed altogether in which case the chaser abutts the rear wall 20. Because it is extremely difficult to machine a precise right angle at the junction defined by the planar seat 16 and rear wall 20, lateral undercut 22 is provided so that a chaser will nest squarely in the station. Further, rear wall 20 is inclined so as to be parallel with the abutting marginal wall of the chaser.

Body 12 is provided with a reduced portion or recess, indicated generally at 25, having a flat side wall 26 stepped laterally from the outer marginal edge of planar seat 16 in a direction opposite to that of wall 26 and substantially parallel therewith. Laterally stepped shoulder 27 is disposed substantially normal to wall 26. Peripheral collar 28 extends laterally from the flat side wall 26 and in cooperation with the butt end or shoulder 27 define the recess 25 for accomodating the fullcrum section of clamp 30. Further, flat side wall 26 is provided with an internally threaded hole 32 for accommodating an externally threaded butt 34.

Clamp, indicated generally at 30, has a fulcrum or heel section 36 and clamping or toe section 38. Hole 40 extends through the fulcrum section. When the chaser is mounted in its station, the fulcrum section 36 of the clamp 30 is inserted into recess 25 against flat side wall 26 in such a manner that the clamping section 38 extends above the planar seat 16 and engages the side wall of the chaser 19. An allen head bolt 34 which is threaded at one end is passed through hole 40 and threadedly engaged with hole 32 whereby the chaser is held firmly in its seat between the side wall 18 and clamping section 38.

The grinding arbor is held by a suitable collet (not shown) at the shank 14. Suitable drive means rotates the collet so as to bring the chamfer of the chaser in contact with a grinding wheel. Machines of this type, such as a Black & Webster Tap Chamfer Grinder, are well known and form no part of this invention.

Although the invention has been described with particular reference to a grinding arbor for chasers, it should be understood that the invention is applicable for handling comparable cutting tools which require grinding or sharpening.

What is claimed is:

1. A grinding arbor for holding one or more chasers, comprising:
   (a) a substantially cylindrical body,
   (b) at least one longitudinally extending section defining a planar seat and a laterally disposed side wall substantially parallel with the longitudinal axis of said body thereby defining a mount for engaging a chaser along its bottom surface opposite the cutting face and along its side lateral to the bottom surface,
   (c) adjustable means laterally disposed relative to said planar seat for engaging the marginal edge of the chaser lateral to the bottom surface engaged by said planar seat, and
   (d) means for releasably securing a chaser in said mount.

2. A grinding arbor according to claim 1, including at least one dowell pin projecting laterally from said laterally disposed side wall.

3. A grinding arbor for holding one or more chasers, comprising:
   (a) a substantially cylindrical body,
   (b) said body having at least one longitudinally extending section of a generally "L" shaped cross-section terminating with the butt end of said body forming at least one planar seat running substantially parallel with the longitudinal axis of said body and a laterally disposed shoulder substantially parallel with the longitudinal axis of said body thereby defining a mount for engaging a chaser along its bottom surface opposite the cutting face and along its side laterally to the bottom surface,
   (c) adjustable means laterally disposed relative to said planar seat for engaging the marginal edge of the chaser lateral to the bottom surface engaged by said planar seat, and
   (d) means for releasably securing a chaser in said mount.

4. A grinding arbor for holding one or more chasers, comprising:
   (a) a substantially cylindrical body having a plurality of longitudinally extending sectorial channels terminating at the butt end of said body,
   (b) each of said sectorial channels having a planar seat extending from the butt end and running substantially parallel with the longitudinal axis of said body, and a shoulder substantially normal with said seat extending upwardly from the inner marginal edge of said seat thereby defining a mount for engaging a chaser along its bottom surface opposite the cutting face and along its side lateral to the bottom surface, and a second shoulder extending downwardly from the outer marginal edge of said planar seat,
   (c) adjustable means laterally disposed relative to said planar seat for engaging the marginal edge of the chaser lateral to the bottom surface engaged by said planar seat, and
   (d) clamping means engageable with said second shoulder and extending above said planar seat for releasably securing a chaser in said mount.

5. A grinding arbor comprising:
   (a) a substantially cylindrical body having a plurality of longitudinally extending sections terminating with the butt end of said body,
   (b) each of said sections having a planar seat extending from the butt end and a pair of side walls laterally stepped in opposite directions from the opposed marginal edges of said planar seat thereby defining a mount for receiving a cutting tool,
   (c) a collar projecting laterally from the downwardly disposed side wall,
   (d) removable stop means projecting from the upwardly disposed wall, and
   (e) a clamp having a fulcrum section for engaging the downwardly disposed side wall and disposed between the collar and butt end of the body and having a clamping section extending above the planar seat whereby a cutting tool seated on said seat is releasably secured.

6. A grinding arbor according to claim 5, including at least one dowell pin projecting laterally from said laterally disposed side wall.

* * * * *